United States Patent
Koakutsu

(10) Patent No.: US 8,459,542 B2
(45) Date of Patent: *Jun. 11, 2013

(54) RECEIPT PRINTING PROCESSING METHOD AND RECEIPT PRINTING PROCESSING SYSTEM

(75) Inventor: Naohiko Koakutsu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,235

(22) Filed: Jun. 4, 2012

(65) Prior Publication Data

US 2012/0243046 A1    Sep. 27, 2012

Related U.S. Application Data

(63) Continuation of application No. 13/228,728, filed on Sep. 9, 2011, now Pat. No. 8,215,544, which is a continuation of application No. 12/357,212, filed on Jan. 21, 2009, now Pat. No. 8,033,452.

(30) Foreign Application Priority Data

Jan. 24, 2008  (JP) ................................. 2008-013436

(51) Int. Cl.
   *G06F 3/12*     (2006.01)
   *G06F 17/00*    (2006.01)
(52) U.S. Cl.
   USPC ........................................ 235/375; 358/1.15
(58) Field of Classification Search
   USPC ........................... 235/375, 379, 383; 358/1.15
   See application file for complete search history.

(56) References Cited

U.S. PATENT DOCUMENTS

| 3,237,198 A | 2/1966 | Slutsky |
| 4,882,475 A | 11/1989 | Miller et al. |
| 5,029,099 A | 7/1991 | Goodman |
| 5,032,707 A | 7/1991 | Gudmundson et al. |
| 5,535,536 A | 7/1996 | Comann |
| 5,774,871 A | 6/1998 | Ferro |

(Continued)

FOREIGN PATENT DOCUMENTS

| EP | 0973114 A1 | 1/2000 |
| EP | 1 249 803 A2 | 10/2002 |

(Continued)

OTHER PUBLICATIONS

Epson Introduces Low-Cost Label Printing for Hospitality Environments, Mobilink, TM-L90 Ideal for Wired or Wireless On-Demand Label Printing, Dallas, TX, Nov. 7, 2005.

(Continued)

*Primary Examiner* — Jamara Franklin

(57) ABSTRACT

When a customer places a special order that changes the content of a product or processing thereof (non-standard order information), a receipt printing processing method and system also produces a special order seal in connection with printing the sales receipt. The receipt printing processing system has a receipt printer and a label printer that is in communication with the receipt printer. When the system receives transaction processing data generated by a POS register used to take orders, a control unit determines if non-standard order information is contained in the transaction processing data. If so, the control unit controls the generation of seal printing data for printing a special order seal, along with controlling the processing of receipt data and the printing of the receipt.

9 Claims, 3 Drawing Sheets

U.S. PATENT DOCUMENTS

| | | | |
|---|---|---|---|
| 5,850,217 A | 12/1998 | Cole | |
| 6,119,933 A | 9/2000 | Wong et al. | |
| 6,317,648 B1 | 11/2001 | Sleep et al. | |
| 6,355,290 B1 | 3/2002 | Soehnlen et al. | |
| 6,522,945 B2 | 2/2003 | Sleep et al. | |
| 6,577,407 B1 | 6/2003 | Kopecki | |
| 6,597,969 B2 | 7/2003 | Greenwald et al. | |
| 6,601,760 B1 | 8/2003 | Nardozzi | |
| 6,739,773 B2 | 5/2004 | Spano | |
| 6,811,080 B1 | 11/2004 | Gold et al. | |
| 7,050,938 B1 | 5/2006 | Prater et al. | |
| 7,110,964 B2 | 9/2006 | Tengler et al. | |
| 7,123,375 B2 | 10/2006 | Nobutani et al. | |
| 7,126,716 B1 | 10/2006 | Kaufman et al. | |
| 7,133,939 B1 | 11/2006 | Desai et al. | |
| 7,460,252 B2 | 12/2008 | Campbell et al. | |
| 7,580,146 B2 * | 8/2009 | Halsema | 358/1.15 |
| 8,164,785 B2 * | 4/2012 | Ferlitsch | 358/1.6 |
| 2002/0004749 A1 | 1/2002 | Froseth et al. | |
| 2002/0032582 A1 | 3/2002 | Feeney, Jr. et al. | |
| 2003/0014305 A1 | 1/2003 | Harden | |
| 2003/0182154 A1 | 9/2003 | Myers et al. | |
| 2004/0038717 A1 | 2/2004 | Mahany et al. | |
| 2004/0068443 A1 | 4/2004 | Hopson et al. | |
| 2004/0267544 A1 | 12/2004 | Michelson et al. | |
| 2005/0015256 A1 | 1/2005 | Kargman | |
| 2005/0036155 A1 | 2/2005 | Reilly | |
| 2005/0043996 A1 | 2/2005 | Silver | |
| 2005/0075934 A1 | 4/2005 | Knight et al. | |
| 2005/0237556 A1 | 10/2005 | Watkins | |
| 2005/0286088 A1 | 12/2005 | Takagi | |
| 2006/0178986 A1 | 8/2006 | Giordano et al. | |
| 2006/0195364 A1 | 8/2006 | Shroff et al. | |
| 2006/0244989 A1 | 11/2006 | Evans | |
| 2007/0056871 A1 | 3/2007 | Griffiths et al. | |
| 2007/0088620 A1 | 4/2007 | Tengler et al. | |
| 2007/0094087 A1 | 4/2007 | Mitchell et al. | |
| 2007/0127691 A1 | 6/2007 | Lert, Jr. | |
| 2007/0150371 A1 | 6/2007 | Gangji | |
| 2007/0221728 A1 | 9/2007 | Ferro et al. | |
| 2008/0052158 A1 | 2/2008 | Ferro et al. | |
| 2008/0052173 A1 | 2/2008 | Liou | |
| 2008/0074697 A1 * | 3/2008 | Sawada et al. | 358/1.15 |
| 2009/0066996 A1 | 3/2009 | Minowa | |
| 2009/0204883 A1 | 8/2009 | Talanis et al. | |

FOREIGN PATENT DOCUMENTS

| | | |
|---|---|---|
| EP | 1318480 A2 | 6/2003 |
| EP | 1580704 A2 | 9/2005 |
| JP | 04-184618 A | 7/1992 |
| JP | 07-006835 U | 1/1995 |
| JP | 07-168980 A | 7/1995 |
| JP | 10-297048 A | 11/1998 |
| JP | 2002-190068 A | 7/2002 |
| JP | 2003016529 | 1/2003 |
| WO | 0154478 A2 | 8/2001 |
| WO | 2004/003866 A1 | 1/2004 |

OTHER PUBLICATIONS

Sheetz.com:: Our Menu, Made_To_Order Food, Aug. 2007.
Office Action dated May 31, 2011 in Japanese Application No. 2008-121924 with translation.

* cited by examiner

RECEIPT PRINTING PROCESSING METHOD AND RECEIPT PRINTING PROCESSING SYSTEM

CROSS-REFERENCE TO RELATED APPLICATIONS

This application is a continuation of, and claims priority under 35 U.S.C. §120 on, U.S. application Ser. No. 13/228,728, filed on Sep. 9, 2011, which is a continuation of U.S. application Ser. No. 12/357,212, filed on Jan. 21, 2009, now U.S. Pat. No. 8,033,452, which claims priority under 35 U.S.C. §119 on Japanese Patent Application No. 2008-013436, filed on Jan. 24, 2008. Each such prior application is incorporated by reference herein in its entirety.

BACKGROUND

1. Field of Invention

The present invention relates to a receipt printing processing method, a receipt printing processing system, and a printer that can be linked to an order entry system in a fast food restaurant, for example, for printing special order seals displaying information about special requests for products ordered by a customer when sales receipts are printed.

2. Description of Related Art

Fast food restaurants such as fast food hamburger restaurants are internally separated into a dining area and a kitchen. Customer orders are typically taken at an order counter between the dining area and the kitchen, and the orders are prepared in the kitchen. A POS register for inputting information about the ordered products and processing transactions, and a receipt printer for receiving the transaction processing data generated by the POS register when payment is completed and printing a receipt based on the transaction processing data, are generally installed at the order counter. A printer or display that is connected to the POS register is installed in the kitchen, and order instructions generated by the POS register based on the input product information are output by the kitchen printer or presented on the kitchen display when payment for the order is completed. The order is then prepared according to the order instructions, and the finished order is then wrapped, carried from the kitchen to the dining room, and delivered to the customer.

Japanese Unexamined Patent Appl. Pub. JP-A-H07-168980 is directed to an order entry system for fast food restaurants that installs an order entry and transaction processing terminal combining both the POS register and the receipt printer in the dining room, and relies on the customers to enter their own orders and complete payment for the order in a self-service model.

Special orders that change how particular products are prepared can also be accepted in fast food restaurants in order to accommodate a wide range of individual customer preferences. For example, hamburgers may be ordered without any pickles, mustard, lettuce, and/or mayonnaise. Information about such special orders is entered together with the ordered product information into the POS register, and sent together with any cooking instructions to the kitchen. The kitchen can therefore easily prepare a hamburger with a special request, while at the same time presenting regular hamburgers on the menu.

Hamburgers with special requests and regular hamburgers look the same, however, particularly when wrapped. A special order seal describing the special request is therefore prepared in the kitchen and applied to the wrapper of the finished order so that the special order can be readily identified and given to the correct customer. However, as the number of variations in the special orders that are possible increases, the number of special order seals that must be readied and kept available also increases. This greatly increases managerial overhead due to the need to order, store, and manage the inventory of numerous different special order seals.

In order to avoid the need to stock and manage numerous special order seals, the POS register may alternatively generate seal printing data for printing the special order seals and send the seal printing data to the kitchen printer to print the special order seal in the kitchen each time special order information is entered at the POS register. However, in order for the POS register to generate the seal printing data and send the seal printing data to the kitchen printer each time a special order is received, the existing application program that is run by the POS register must be modified, thus increasing the cost of introducing a system for locally printing special order seals.

SUMMARY OF INVENTION

The present invention provides receipt printing processing methods and receipt printing processing system that enables printing special order seals showing information for special or non-standard orders in connection with printing a receipt after a customer places a special order, and does so without requiring any modification to the application program that is run by a host device to receive product orders and process payments.

A first aspect of the invention is a receipt printing processing method including steps of providing a first printer that prints on a first paper and a second printer that prints on second paper, receiving first data, e.g., transaction processing data, using a control unit; determining, using the control unit, if predetermined information, e.g., order information that changes the content of a product or processing thereof, is contained in the first data; generating second data, e.g., seal printing data, for printing, using the control unit, if the predetermined information is contained in the first data; sending the first data, using the control unit, to the first printer; sending the second data, using the control unit, to the second printer; printing the first data on the first paper using the first printer; and printing the second data on the second data using the second printer.

According to this aspect of the invention, if the predetermined information, e.g., non-standard order information, is contained in the first data that is generated when payment for an order is received, the control unit controls the processing and printing of both the first and second data. The use of the control unit streamlines the processing. The cost of introducing a system for printing second data, e.g., special order seals, can thus be reduced.

Furthermore, by way of example, if the first printer is located at the order counter in the customer service area and the second printer is located in the kitchen, a special order seal corresponding to a particular receipt is printed in the kitchen each time a receipt is printed for a customer who places a special order. Products can therefore be prepared while confirming special orders by means of the special order seals in the kitchen. The special order seal can then be applied to the wrapper of the finished product to prevent errors delivering products to the customers. In addition, because the special order seals are issued as needed whenever order payment is completed, there is no need to prepare and stock preprinted special order seals. The task of managing an inventory of special order seals is therefore greatly reduced.

So that the second data, e.g., seal printing data, can be easily created, the seal printing data preferably includes all or a part of the first data, e.g., transaction processing data.

Preferably, the receipt printing processing method also has a step of storing a key code for identifying the predetermined information, e.g., non-standard order information, in the first printer before printing the first data. The predetermined information detection step then determines that non-standard order information is contained in the first data, e.g., transaction processing data, if a text string matching the key code is found in the transaction processing data. Yet further preferably, the key code is a text string relating to the presence, absence, increase, or decrease of content in the product.

This aspect of the invention enables easily determining if non-standard order information is contained in the transaction processing data. In addition, if it becomes possible to accept a new type of special order, whether non-standard order information for the new type of order is contained in the transaction processing data can be easily determined by storing a new key code in the first printer.

In order to easily generate the second data, e.g., seal printing data, the second data generating step yet further preferably generates the seal printing data by extracting a text string matching the key code from the first data, e.g., transaction processing data.

Another aspect of the invention is a receipt printing processing system comprising a first printer that prints on a first paper; a second printer that prints on a second paper; and a control unit that (i) detects predetermined information, e.g., order information that changes the content of a product or processing thereof, in first data, e.g., transaction processing data; (ii) generates second data, e.g., seal printing data for printing a seal showing the detected predetermined information, e.g., non-standard order information, and (iii) sends the second data to the second printer.

The use of the control unit streamlines the processing of transaction processing data and seal printing data, as well as the printing of a receipt and a seal using different printers.

Furthermore, by way of example, if the first printer is located at the order counter in the customer service area and the second printer is located in the kitchen, a special order seal corresponding to a particular receipt is printed in the kitchen each time a receipt is printed for a customer who places a special order. Products can therefore be prepared while confirming special orders by means of the special order seals in the kitchen. The special order seal can then be applied to the wrapper of the finished product to prevent errors delivering products to the customers. In addition, because the special order seals are issued as needed whenever order payment is completed, there is no need to prepare and stock preprinted special order seals. The task of managing an inventory of special order seals is therefore greatly reduced.

Further preferably, the first printer has a key code storage that stores a key code for identifying the predetermined data, e.g., non-standard order information, and the control unit determines that non-standard order information is contained in the first data, e.g., transaction processing data, if a text string matching the key code is found in the transaction processing data.

This aspect of the invention makes identifying special order information contained in the transaction processing data simple.

In addition, if it becomes possible to accept a new type of special order, whether non-standard order information for the new type of order is contained in the transaction processing data can be easily determined by storing a new key code in the first printer.

In order to easily generate the seal printing data, the control unit extracts a text string matching the key code from the first data, e.g., transaction processing data, to generate the second data, e.g., seal printing data.

Yet further preferably, the second printer is connected wirelessly to the first printer so that the second printer can be located remotely to the first printer, such as in a kitchen.

Yet further preferably, the second printer is a label printer that prints on roll paper having an adhesive surface on the back side of a paper web, and cuts the roll paper after each print job is completed.

If a so-called sticky label printer is used as the second printer, the printed special order seals can be easily affixed to the product.

EFFECT OF THE INVENTION

If special or non-standard order information is contained in the transaction processing data that is generated when payment for an order is received, the present invention enables a first printer to a print receipt for the transaction and a second printer to print a special order seal displaying the non-standard order information.

The arrangements advantageously enable the printing of special order seals from the second printer without modifying the application program run by the host device. The cost of introducing a system for printing special order seals can thus be reduced.

Furthermore, if the first printer is located at the order counter in the customer service area and the second printer is located in the kitchen, a special order seal corresponding to a particular receipt is printed in the kitchen each time a receipt is printed for a customer who places a special order. Products can therefore be prepared while confirming special orders by means of the special order seals in the kitchen. The special order seal can then be applied to the wrapper of the finished product to prevent errors delivering products to the customers. In addition, because the special order seals are issued as needed whenever order payment is completed, there is no need to prepare and stock preprinted special order seals. The task of managing an inventory of special order seals is therefore greatly reduced.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A preferred embodiment of a receipt printing processing system according to the present invention is described below with reference to the accompanying figures. The receipt printing processing system according to this embodiment of the invention is part of an order entry system used in a fast food restaurant such as a hamburger restaurant.

Order Entry System

Figure 1:
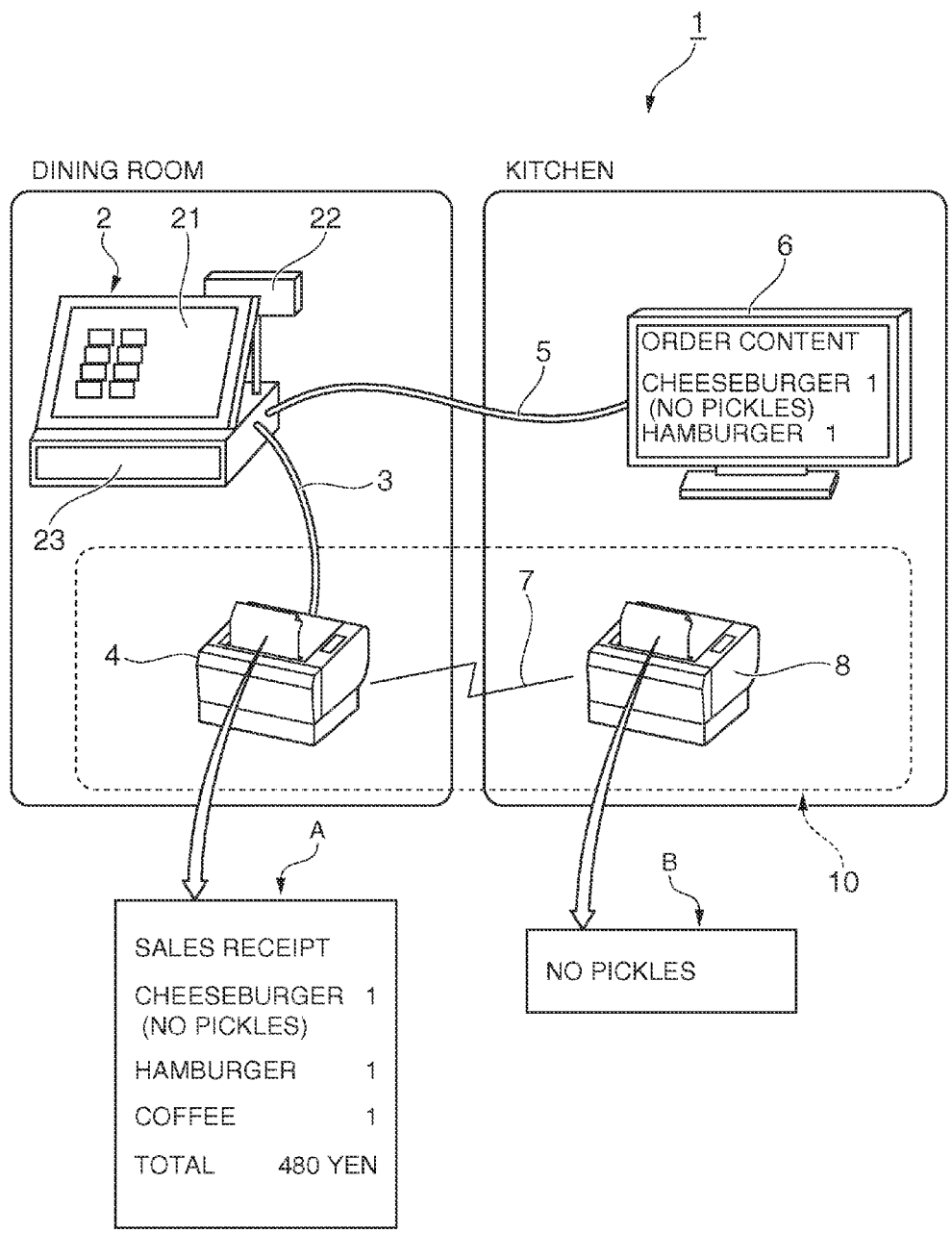
FIG. 1 schematically illustrates an order entry system according to the present invention.

FIG. 1 schematically describes an order entry system. This order entry system 1 includes a POS register 2 for receiving product orders and for processing payment transactions, and a receipt printer (first printer) 4 that is connected to the POS register 2 by a USB (Universal Serial Bus) cable 3 and receives transaction data generated by the POS register 2 when payment is completed to print a receipt. Also included in the order entry system 1 are a display 6 connected to the POS register 2 by a cable 5, and a label printer 8 (second printer) that is connected to the receipt printer 4 through a wireless LAN 7.

The POS register 2 and receipt printer 4 are installed at the order counter located in the dining room of the hamburger restaurant, and the display 6 and label printer 8 are installed on a counter in the kitchen of the restaurant. The receipt printer 4, wireless LAN 7, and label printer 8 are parts of the receipt printing processing system 10.

The POS register 2 is a computer that runs an application program for receiving product orders and processing payments, and includes a touch panel 21 as a display and operating unit, a customer display unit 22 for displaying information for the customer, and a cash register unit 23 for handling payments. When a customer enters a product order at the order counter, a clerk operates the touch panel 21 to input information about the ordered product to the POS register 2.

A list of product selections such as hamburger, cheeseburger, french fries, salad, and coffee is displayed on the touch panel 21. When receiving a customer's order, the store clerk touches the icon for the ordered product to input the product information. When a particular product icon is touched, a list of special orders specifying how the product is to be prepared is displayed for each applicable product. For example, if a hamburger or cheeseburger is ordered, icons for selecting "no pickles", "no mustard", "no lettuce", "no mayonnaise", "extra mayonnaise", and "less mayonnaise" are displayed on the touch panel 21. If the customer makes one of the special requests after ordering a particular product, the clerk touches the corresponding icon to input the special order. In this example information for an order containing one cheeseburger with no pickles, one hamburger, and one coffee is entered.

When the customer then pays for the order and the clerk presses the payment key on the touch panel 21, the POS register 2 generates the transaction processing data based on the input product information and sends the transaction processing data to the receipt printer 4. The transaction processing data generated by the POS register 2 includes the product information such as the product names and quantities of the ordered products, the order total, and information about any special orders that were received.

The POS register 2 then generates kitchen order data based on the input product information and special order information, and outputs the kitchen order data to the display 6 located in the kitchen. The product orders displayed on the display 6 include "1 cheeseburger" with "no pickles" as the special order, and "1 hamburger" as another product requiring cooking. The kitchen staff then cooks and prepares the products displayed on the display 6. Orders for coffee, for example, are prepared using the coffee machine located at the order counter on the dining room side.

When the receipt printer 4 receives the transaction processing data generated by the POS register 2, the receipt printer 4 prints a receipt A on which the ordered products, the quantity of each, any special orders for each product, and the order total are printed based on the transaction processing data. When special order information is included in the transaction processing data, the receipt printer 4 generates seal printing data for printing a special order seal B showing the special order information, and sends this seal printing data to the label printer 8. The receipt printer 4 thus generates and sends to the label printer 8 seal printing data for printing a special order seal B saying "no pickles".

The label printer 8 receives the seal printing data and prints the special order seal B. Because a special order seal B saying "no pickles" is output from the label printer 8, the kitchen staff can apply the special order seal B when wrapping the finished special order product so that it can be easily and correctly identified from the outside.

When all of the ordered products are prepared, they are delivered to the order counter in the dining room. The order clerk then delivers the items from the kitchen with the coffee and other items prepared at the order counter to the customer.

Receipt Printing Processing System

Figure 2:
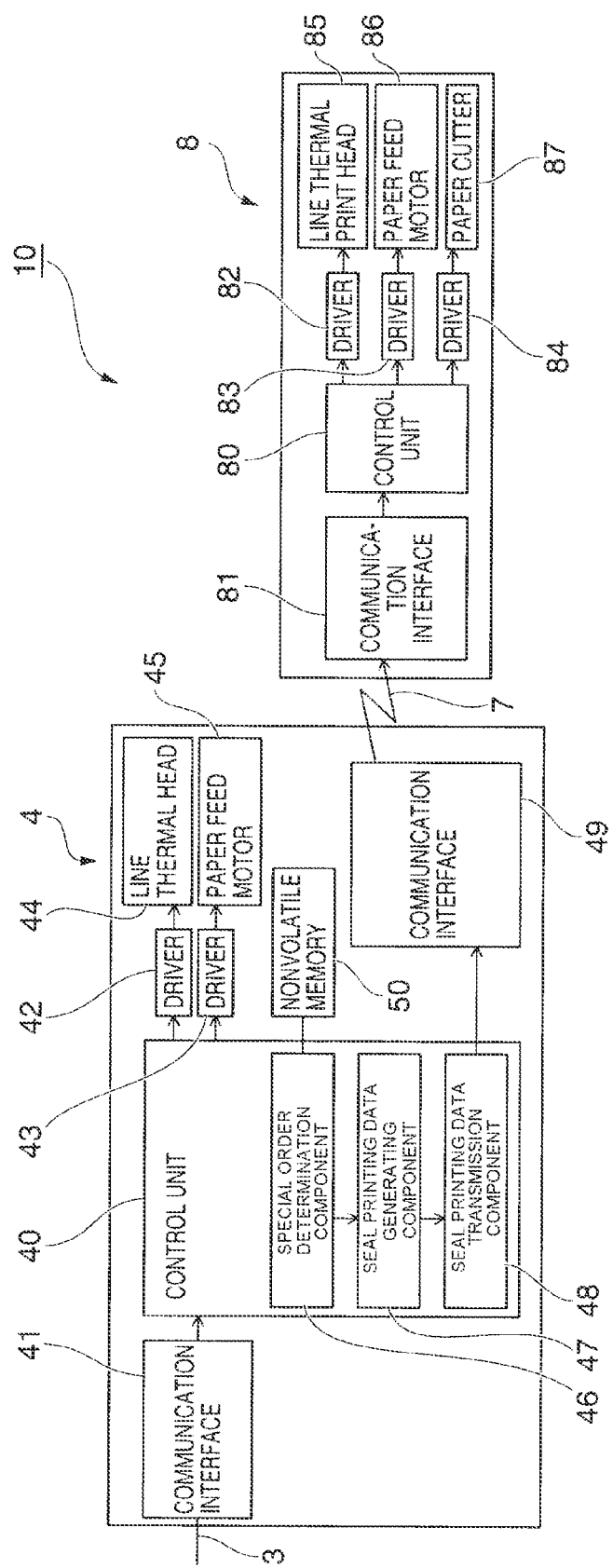
FIG. 2 is a functional block diagram of the receipt printing processing system according to the present invention.

FIG. 2 is a schematic block diagram showing the control system of a receipt printing processing system. The receipt printing processing system 10 includes the receipt printer 4, wireless LAN 7, and label printer 8.

The receipt printer 4 is preferably a line thermal printer for printing on roll paper delivered from a roll. The control system of the receipt printer 4 includes a control unit 40 having a CPU, ROM, and RAM, and transaction processing data from the POS register 2 is supplied to the control unit 40 through a communication interface 41. A line thermal head 44 and paper feed motor 45 are connected to the output side of the control unit 40 through an intervening head driver 42 and motor driver 43. When transaction processing data is received, the control unit 40 controls driving these other devices to print a receipt A.

The control unit 40 also includes a special order determination component 46, a seal printing data generating component 47, and a seal printing data transmission component 48. Each of these components may be implemented using appropriate hardware, firmware or software, or appropriate combination thereof, as would be understood by one skilled in the art in light of the disclosure herein.

The special order determination component 46 determines if special order information is contained in the received transaction processing data. The seal printing data generating component 47 generates seal printing data for issuing a special order seal B displaying the special order information if special order information is contained in the transaction processing data. The seal printing data transmission component 48 sends the seal printing data generated by the seal printing data generating component 47 to the label printer 8.

Also connected to the control unit 40 are a communication interface 49 for communicating with the label printer 8 over the wireless LAN 7, and nonvolatile memory 50 as a key code holder. The communication interface 49 preferably conforms to a standard such as Bluetooth®, IEEE 802.11a, IEEE 802.11b, or IEEE 802.11g.

The nonvolatile memory 50 stores a plurality of key codes that are used to identify special order information contained in the transaction processing data. In this embodiment of the invention key codes are stored as the character strings for such special order information as "with ketchup", "no pickles", "no mustard", "no lettuce", "no mayonnaise", "extra mayonnaise", and "less mayonnaise". When the special order determination component 46 detects a character string matching one of the key codes in the received transaction processing data, it knows that special order information is contained in the transaction processing data.

When the special order determination component 46 determines that the transaction processing data contains special order information, the seal printing data generating component 47 extracts the character string including the key code and generates the seal printing data. Each time seal printing data is generated, the seal printing data transmission component 48 sends the seal printing data through the communication interface 49 to the label printer 8.

The label printer 8 is a so-called sticky label printer that prints on roll paper having adhesive on the back side of the paper and cuts the roll paper after each print job is completed. The control system of the label printer 8 has a control unit 80 including a CPU, RAM, and ROM, and the seal printing data sent from the receipt printer 4 is supplied through a communication interface 81 to the control unit 80. The communication interface 81 is a communication interface for communicating wirelessly with the communication interface 49 of the receipt printer 4. A line thermal print head 85, paper feed motor 86, and paper cutter 87 are connected to the output side of the control unit 80 through a head driver 82, motor driver 83, and cutter driver 84. When seal printing data is received, the control unit 80 controls driving these other devices to produce a special order seal B.

Receipt Printing Process

Figure 3:
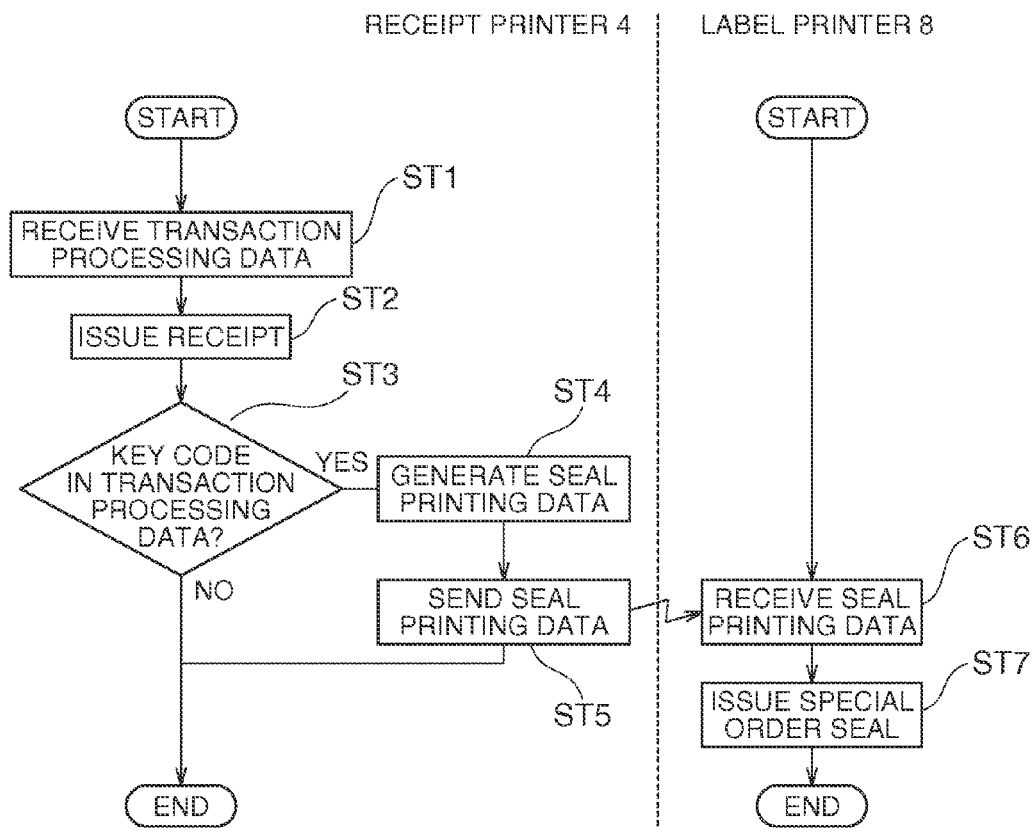
FIG. 3 is a flow chart describing the operation of the receipt printing processing system according to the present invention.

The receipt printing process executed by the receipt printing processing system 10 is described next with reference to FIG. 1 and FIG. 3. FIG. 3 is a flow chart describing the receipt printing process of the receipt printing processing system 10.

When the receipt printing processing system 10 is part of an order entry system 1, a plurality of key codes for identifying special order information are stored in nonvolatile memory 50 in the receipt printer 4. Text strings such as "with ketchup", "no pickles", "no mustard", "no lettuce", "no mayonnaise", "extra mayonnaise", and "less mayonnaise", for example, may be stored as key codes that identify special order information.

When the order entry system 1 is operating, the receipt printer 4 is in a data wait state waiting for transaction processing data to be sent from the POS register 2. The label printer 8 also enters a data wait state waiting for seal printing data to be sent from the receipt printer 4.

When the customer then pays for the products, the POS register 2 generates the transaction processing data. The generated transaction processing data is sent from the POS register 2 to the receipt printer 4. In the example shown in FIG. 1, the transaction processing data includes text strings for "1 cheeseburger", "no pickles", "1 hamburger", "1 coffee", "Total 480 yen", and a control code indicating line returns or the end of the job.

When the receipt printer 4 receives the transaction processing data (step ST1), the control unit 40 of the receipt printer 4 controls driving the line thermal head 44 and the paper feed motor 45 to issue a receipt A (step ST12). In this example, "1 cheeseburger", "no pickles", "1 hamburger", "1 coffee", and "Total 480 yen" are printed on the issued receipt A.

To issue a receipt, the special order determination component 46 searches the transaction processing data temporarily stored in RAM in the control unit 40 to detect if there are any text strings matching the key codes stored in the nonvolatile memory 50 (step ST3). In this example, "no pickles" is detected as the text string matching a key code.

When one or more text strings matching a key code is found in the transaction processing data in step ST3, the seal printing data generating component 47 extracts the text string matching the key code from the transaction processing data and generates the seal printing data (step ST4). In this example, "no pickles" is extracted from the transaction processing data, and a control code indicating the end of the data, such as a cut command for cutting the printer paper, is added to the text string to generate the seal printing data.

When the seal printing data is generated, the seal printing data transmission component 48 sends the resulting seal printing data through the communication interface 49 to the label printer 8 (step ST5).

The label printer 8 receives the seal printing data and prints the special order seal B (steps ST6, ST7). The label printer 8 thus outputs a special order seal B on which "no pickles" is printed. When printing receipt A and special order seal B is finished, the receipt printer 4 and label printer 8 return to the data wait state.

If a text string matching a key code is not found in the transaction processing data in step ST3, the seal printing data is not generated, seal printing data is therefore not sent from the receipt printer 4 to the label printer 8, and a special order seal B is not printed. The label printer 8 therefore remains in the data wait state.

Effect of the Receipt Printing Processing System

When special order information is included in the transaction processing data that is generated when payment is processed, the receipt printer 4 that receives the transaction processing data and prints a receipt A also generates and sends seal printing data for printing the special order information on a special order seal B to the label printer 8.

Because the receipt printer 4 that receives the transaction processing data generated by the host device generates and sends the seal printing data to the label printer 8 instead of the host device, such as the POS register 2 that receives product orders and processes transactions, generating and sending the seal printing data to the label printer 8, the label printer 8 can be used to print special order seals B without modifying the application program that runs on the host device. The cost of introducing a system for printing special order seals B can therefore be suppressed.

Furthermore, if the receipt printer 4 is located at the order counter in the dining room and the label printer 8 is located in the kitchen, a special order seal B corresponding to a particular receipt A is printed in the kitchen each time a receipt A is printed for a customer. Products can therefore be prepared while confirming special orders by means of the special order seals B in the kitchen. The special order seal B can then be applied to the wrapper of the finished product to prevent errors delivering products to the customers. In addition, because the special order seals B are issued as needed whenever order payment is completed, there is no need to prepare and stock preprinted special order seals B. The task of managing an inventory of special order seals B is therefore greatly reduced.

In this embodiment of the invention the receipt printer 4 has nonvolatile memory 50 for storing key codes identifying the special order information, and the special order determination component 46 determines that an order contains special order information when a text string matching a key code is found in the transaction processing data. It is therefore easy to determine if special order information is contained in the transaction processing data.

Furthermore, if a new type of special order is introduced and can be entered into the order entry system 1, a corresponding new key code can be added to the nonvolatile memory 50 to enable determining if the special order information is contained in the received transaction processing data.

Furthermore, because the text strings matching the key codes are extracted from the transaction processing data and used as the seal printing data, the seal printing data generating component 47 can easily generate the seal printing data.

Furthermore, because a sticky label printer is used as the label printer 8, the printed special order seals B can be easily affixed to the products. In addition, because the label printer 8 and receipt printer 4 are connected by a wireless LAN 7, the label printer 8 can be easily located in the kitchen or other location remote to the receipt printer 4.

OTHER EMBODIMENTS

In the embodiment described above the seal printing data generating component 47 extracts text strings matching key codes from the transaction processing data to generate the seal printing data, but the seal printing data may be generated from all of the transaction processing data.

The seal printing data may also be generated by extracting everything except for the sale total from the transaction processing data. Because information about all of the ordered products together with the special order information is displayed on the special order seals printed based on this seal printing data, the seal can be affixed to a take-out bag containing all of the ordered products, for example, to show that special order products are also contained in the bag. This helps prevent giving a customer the wrong order when handing a bag containing a take-out order to the customer.

Note that the special order information is obviously not limited to changing the specified content, and may also include information about additions, such as "add cheese," as well as common customer requests relating to temperature, such as "normal temperature," or other preparation instructions, such as "cut in half."

The receipt printer 4 and label printer 8 are connected wirelessly in the foregoing embodiment, but a wired connection may obviously be used.

The order entry system 1 described above is an example of an order entry system used in a fast food restaurant, but the order entry system that can be linked to the receipt printing processing system 10 in this embodiment of the invention is not limited to this order entry system 1. The receipt printing processing system 10 can be introduced as a replacement for a receipt printer that receives transaction processing data from a host device and prints receipts.

While embodiments of the invention have been described and illustrated, numerous modifications and variations will be apparent to those skilled in the art in light of the disclosure herein. Each such variation and modification falls within the spirit and scope of the invention to the extent that it falls within the scope of any of the following claims.

Furthermore, in other embodiment Character strings "with", "no", "extra" and "less" may be stored as key codes that identify text strings such as "with ketchup", "no pickles", "no mustard", "no lettuce", "no mayonnaise", "extra mayonnaise", and "less mayonnaise", for example, as special order information. More particularly, special orders are entered using data sets including key codes for "with," "no," "extra" and "less" in combination with "ketchup", "pickles", "mustard", and "lettuce", for example. When the special order determination component 46 detects a character string including one of the key codes in the received transaction processing data, it knows that special order information is contained in the transaction processing data. After detecting a character string including one of the key codes in the received transaction processing data, the same as described in the previous embodiment, the seal printing data generating component 47 generates the seal printing data and the seal printing data transmission component 48 sends the seal printing data to the label printer 8 for printing a special order seal B.

What is claimed is:

1. A receipt printing processing method, comprising steps of:
    providing a first printer that prints on a first paper and a second printer that prints on a second paper;
    receiving first data using a control unit;
    determining, using the control unit, if predetermined information is contained in the first data;
    generating second data for printing on the second paper, using the control unit, if the predetermined information is contained in the first data;
    sending the first data, using the control unit, to the first printer;
    sending the second data, using the control unit, to the second printer;
    printing the first data on the first paper using the first printer; and
    printing the second data on the second paper using the second printer.

2. The receipt printing processing method described in claim 1, wherein the second data includes all or a part of the first data.

3. The receipt printing processing method described in claim 1, wherein the method further comprising the steps of:
    storing a key code for identifying the predetermined information in the first printer before printing the first data; and
    determining that the predetermined information is contained in the first data, if a text string matching the key code is found in the first data in the determining step.

4. The receipt printing processing method described in claim 3, wherein the key code is part of a text string relating to the presence, absence, increase, or decrease of content in the product.

5. The receipt printing processing method described in claim 3, wherein the second data generating step comprises generating the second data by extracting a text string matching the key code from the first data.

6. A receipt printing processing system, comprising:
    a first printer that prints on a first paper;
    a second printer that prints on a second paper; and
    a control unit that (i) detects predetermined information in first data, (ii) generates second data for printing a seal showing the detected predetermined information, (iii) sends the second data to the second printer, (iv) sends the first data to the first printer;
    wherein the first printer prints the first data on the first paper and the second printer prints the second data on the second paper.

7. The receipt printing processing system described in claim 6, wherein the second data includes all or a part of the first data.

8. The receipt printing processing system described in claim 6, wherein the first printer further includes a key code storage that stores a key code for identifying the predetermined information; and the control unit determines that the predetermined information is contained in the first data, if a text string matching the key code is found in the first data.

9. The receipt printing processing system described in claim 8, wherein the first printer extracts a text string matching the key code from the first data to generate the second data.

* * * * *